(12) United States Patent
Cheng et al.

(10) Patent No.: US 9,864,507 B2
(45) Date of Patent: Jan. 9, 2018

(54) METHODS AND APPARATUS FOR CLICK DETECTION ON A FORCE PAD USING DYNAMIC THRESHOLDS

(71) Applicant: SYNAPTICS INCORPORATED, San Jose, CA (US)

(72) Inventors: Yi-Hsun Ethan Cheng, Cupertino, CA (US); Mohamed Ashraf Sheik-Nainar, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 311 days.

(21) Appl. No.: 14/037,939

(22) Filed: Sep. 26, 2013

(65) Prior Publication Data
US 2015/0084874 A1 Mar. 26, 2015

(51) Int. Cl.
*G06F 3/041* (2006.01)
*G06F 3/0488* (2013.01)
G06F 3/045 (2006.01)
G06F 3/044 (2006.01)
G06F 3/0354 (2013.01)
G06F 3/01 (2006.01)

(52) U.S. Cl.
CPC ........ *G06F 3/04883* (2013.01); *G06F 3/0414* (2013.01); *G06F 3/016* (2013.01); *G06F 3/03547* (2013.01); *G06F 3/041* (2013.01); *G06F 3/044* (2013.01); *G06F 3/0488* (2013.01)

(58) Field of Classification Search
CPC ...... G06F 3/0488; G06F 3/016; G06F 3/0414; G06F 3/03547; G06F 3/04883; G06F 3/0416; G06F 3/044; G06F 2203/04105
USPC .................................... 345/173–174
See application file for complete search history.

(56) References Cited

U.S. PATENT DOCUMENTS

| | | | |
|---|---|---|---|
| 5,543,590 A * | 8/1996 | Gillespie | G06F 3/041 178/18.06 |
| 8,344,883 B2 | 1/2013 | Ujii et al. | |
| 2006/0284858 A1 | 12/2006 | Rekimoto | |
| 2009/0153340 A1 | 6/2009 | Pinder et al. | |
| 2009/0160793 A1 | 6/2009 | Rekimoto | |
| 2009/0237374 A1 | 9/2009 | Li et al. | |

(Continued)

OTHER PUBLICATIONS

International Search Report and Written Opinion issued in PCT/US2014/057189, dated Dec. 22, 2014. (11 pages).

*Primary Examiner* — Jimmy H Nguyen
(74) *Attorney, Agent, or Firm* — Osha Liang LLP

(57) ABSTRACT

A method and device are provided for measuring force on a force enabled input device having a touch surface. The method includes detecting force information associated with an input object contacting the touch surface, and determining a push event if the force information is either greater than a predetermined static push threshold value, or a substantially monotonic increase of at least a dynamic push threshold value above a low baseline value. The method thereafter determines a release event if the force information either decreases below a predetermined static release threshold value, or decreases from a maximum baseline value by an amount greater than a dynamic release threshold value. The method initiates a first type of user interface action associated with the input object based on a determination of the push event and the release event, wherein the first type of user interface action may comprise determining a virtual button click.

20 Claims, 10 Drawing Sheets

(56) References Cited

U.S. PATENT DOCUMENTS

| | | |
|---|---|---|
| 2010/0079404 A1 | 4/2010 | Degner et al. |
| 2010/0271326 A1 | 10/2010 | Hu et al. |
| 2011/0141052 A1 | 6/2011 | Bernstein et al. |
| 2013/0093715 A1* | 4/2013 | Marsden ................ G06F 3/044 345/174 |
| 2015/0116205 A1* | 4/2015 | Westerman ............ G06F 3/016 345/156 |

* cited by examiner

METHODS AND APPARATUS FOR CLICK DETECTION ON A FORCE PAD USING DYNAMIC THRESHOLDS

TECHNICAL FIELD

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some clickable input devices also have the ability to detect force applied to a sensing surface in addition to determining positional information. For example, Degner U.S. Patent Application Publication No. 2010/0079404 discloses an input device having a touch-sensitive track pad capable of detecting an X-Y position of an input object proximate the track pad, as well as a movement indicator for detecting movement of the movable track pad. As the user presses down and "clicks" the pad to simulate a button press, the device provides tactile feedback to the user confirming the simulated button click.

In contrast to presently known clickable input pads, force pad input devices allow the user to simulate a click event by pressing down on the track surface with at least a predetermined threshold level of force to satisfy a "push" force threshold, and to effect a simulated (or virtual) button click when the applied force is reduced by a sufficient amount to satisfy a "release" threshold.

Presently known force pads are limited in that they do not provide tactile feedback to indicate a successful click. Moreover, presently known force pads do not adapt to an individual user's force preferences. That is, if the predetermined force threshold needed to detect a click is set too high, the device may fail to detect an intended click. Conversely, if the predetermined force threshold needed to detect a click is set too low, the device may detect false positives; that is, the device may declare a click when the user does not intend one.

Devices and methods are thus needed which overcome the foregoing shortcomings.

BRIEF SUMMARY

The embodiments of the present invention provide a device and method that facilitates improved device usability. Specifically, the device and method provide improved user interface functionality by facilitating user input with input objects, particularly fingers, on a force pad.

In an embodiment, a virtual button click is declared when a push event is followed by a release event. More particularly, a push event may be determined based on a force signal signature exhibiting a monotonic force increase of at least a first predetermined threshold value, and a release event may be determined based on a monotonic force decrease of at least a second predetermined threshold value.

BRIEF DESCRIPTION OF DRAWINGS

Preferred exemplary embodiments will hereinafter be described in conjunction with the appended drawing figures, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability by providing an improved input pad which simulates a button press when the input pad surface is pressed downwardly by an input object, such as a finger.

Figure 1:
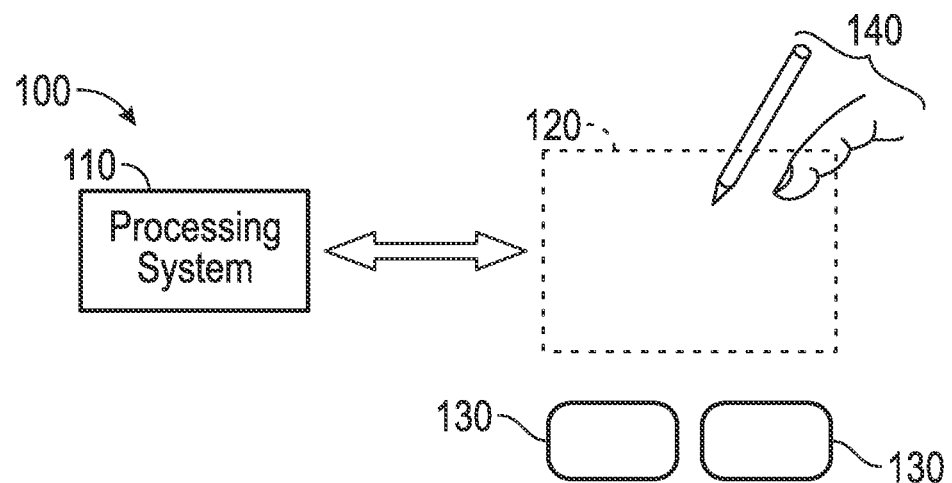
FIG. 1 is a block diagram of an exemplary electronic system that includes an input device and a processing system in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad" or "touch sensor device") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region.

Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In various embodiments, the input device further comprises one or more force sensors as part of an interface for an electronic system. The input device has a processing system, an input surface, sensing region and a single or multiple force sensors implemented proximate the sensing region. Furthermore, it should be noted that one or more force sensors may be provided inside or outside the perimeter of the input surface. The input device uses both the proximity sensor and the force sensor(s) to provide an interface for an electronic system.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit.

As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists).

In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110).

Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction.

In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 2:
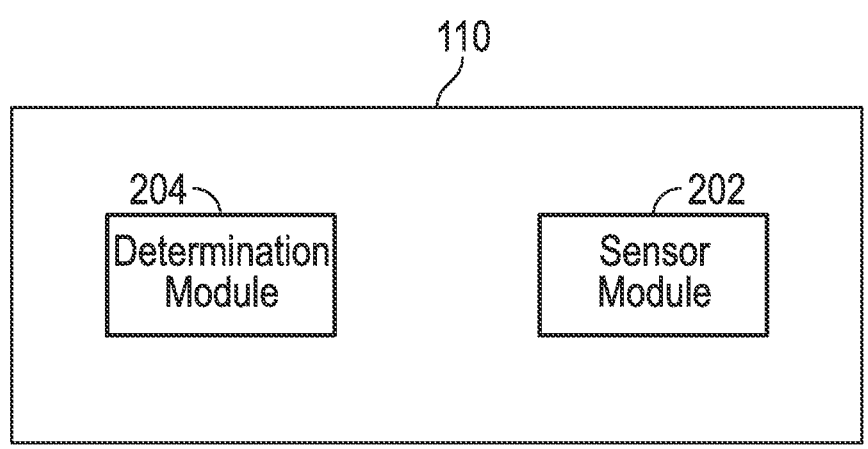
FIG. 2 is a schematic view of an exemplary processing system in accordance with an embodiment.

Referring now to FIGS. 1 and 2, the processing system 110 includes a sensor module 202 and a determination module 204. Sensor module 202 is configured to receive resulting signals from the sensor electrodes associated with sensing region 120. Determination module 204 is configured to process the data, and to determine positional information and the force information for one or more input objects in the sensing region.

Figure 3:
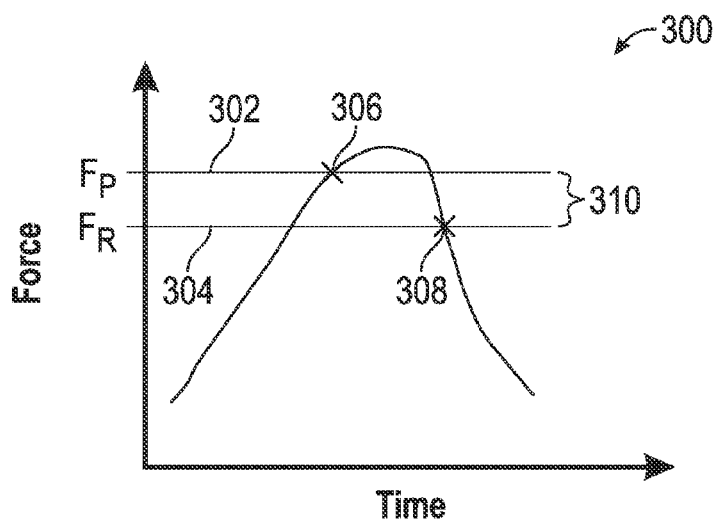
FIG. 3 is a graph of applied force versus time illustrating a static push event and a static release event resulting in a click event in accordance with an embodiment.

Turning now to FIG. 3, a graph 300 of applied force versus time illustrates a static push force threshold ($F_P$) 302 and a static release force threshold ($F_R$) 304. In the illustrated embodiment the release threshold 304 is less than the push threshold by an amount 310 which approximates the hysteresis typically associated with mechanical systems. The hysteresis region 310 also provides a buffer to enhance system stability. In a static system of the type shown in FIG. 3, a push event 306 is determined (or declared) when the applied force reaches the push threshold 302, and a release event 308 is declared when the applied force drops down to the release threshold 304. A click event (e.g., a virtual button click) occurs when a push event is followed by a release event.

Figure 4:
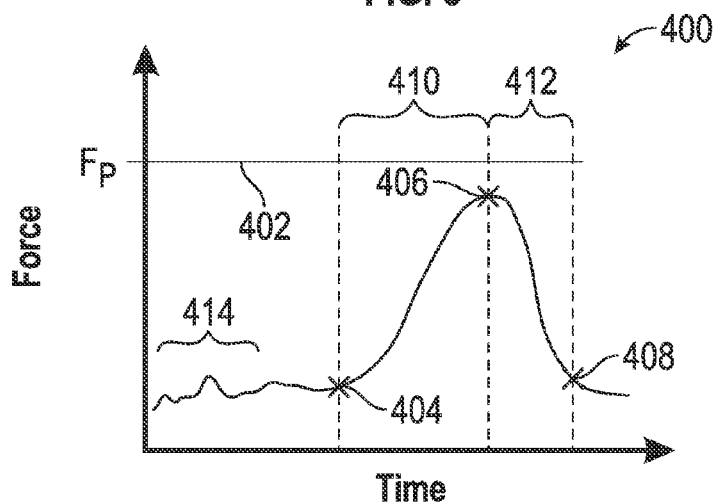
FIG. 4 is a graph of applied force versus time illustrating a monotonic increase in force followed by a monotonic decrease in force in accordance with an embodiment.

FIG. 4 is a graph 400 of applied force versus time illustrating an embodiment wherein a push event and a release event may be determined dynamically, as opposed to the static regime shown in FIG. 3. More particularly, the graph 400 includes a static push force threshold ($F_P$) 402 (as a reference), a random walk region 414 used to determine a baseline value (discussed below in conjunction with FIG. 5), a push region 410 bounded by a push initiation point 404 and an apex 406, and a release region 412 bounded by the apex 406 and a release termination point 408. In an embodiment, a push event may be declared at the apex 406 if the push region 410 is characterized by a substantially monotonic increase in force, and a release event may be declared at point 408 if the region 410 is characterized by a substantially monotonic decrease in force.

Accordingly, a button click may be determined if the force signal signature exhibits a monotonic increase followed by a monotonic decrease, even though the apex 406 does not breach the static force threshold 402. In this way, applied force which the user intended as a click may be recognized as such in a dynamic regime, even though the same force signal would result in a false negative in a traditional static force sensing regime.

In order to mitigate false positives in a dynamic regime, however, it is desirable to establish a minimum amount by which a monotonic increase should extend before it constitutes an intended push, and to similarly establish a minimum amount by which a monotonic decrease should extend before it constitutes an intended release.

Figure 5:
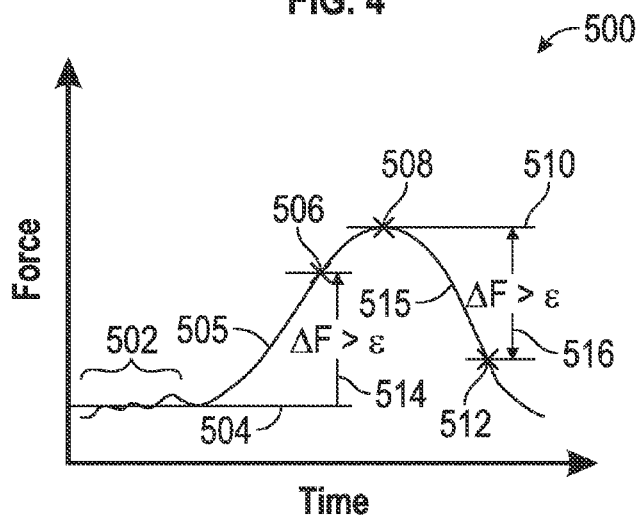
FIG. 5 is a graph of applied force versus time illustrating a characteristic signal signature exhibiting a monotonic increase in force followed by a monotonic decrease in force corresponding to a dynamic push event and a dynamic release event in accordance with an embodiment.

Referring now to FIG. 5, a graph 500 illustrates a force signal which exhibits a monotonic increase in force of sufficient extent to qualify as an intended push, followed by a monotonic decrease in force of sufficient extent to qualify as an intended release. More particularly, graph 500 includes a random walk region 502 which may be used to compute a running (i.e., dynamically updated) baseline value 504, a monotonically increasing segment 505, a push event 506, an apex 508 which may be used to establish a local maximum force level 510, a monotonically decreasing segment 515, and a release event 512.

The random walk region 502 represents a combination of system noise and variations in force associated with the user touching the force pad but without initiating a click. Those skilled in the art will appreciate that the baseline value 504 may be determined from the random walk using a variety of known techniques, such as, for example, by calculating an average value looking back over a predetermined period of time (e.g., 500 milliseconds).

In accordance with various embodiments and with continued reference to FIG. 5, the monotonically increasing segment 505 may deemed to be of sufficient extent to constitute an intended push when it increases above the baseline value 504 by a predetermined threshold amount $\epsilon$; that is, the segment 505 may establish a push event at point 506 when the increase in force (▲F), indicated by upward arrow 514, equals or exceeds $\epsilon$ (i.e., $\Delta F \geq \epsilon$). Similarly, the monotonically decreasing segment 515 may deemed to be of sufficient extent to constitute an intended release when it decreases below the local maximum force level 510 by a predetermined threshold amount $\epsilon$; that is, the segment 515 may establish a release event at point 512 when the decrease in force (▲F), indicated by downward arrow 516, equals or exceeds $\epsilon$ (i.e., $\Delta F \geq \epsilon$).

Figure 6:
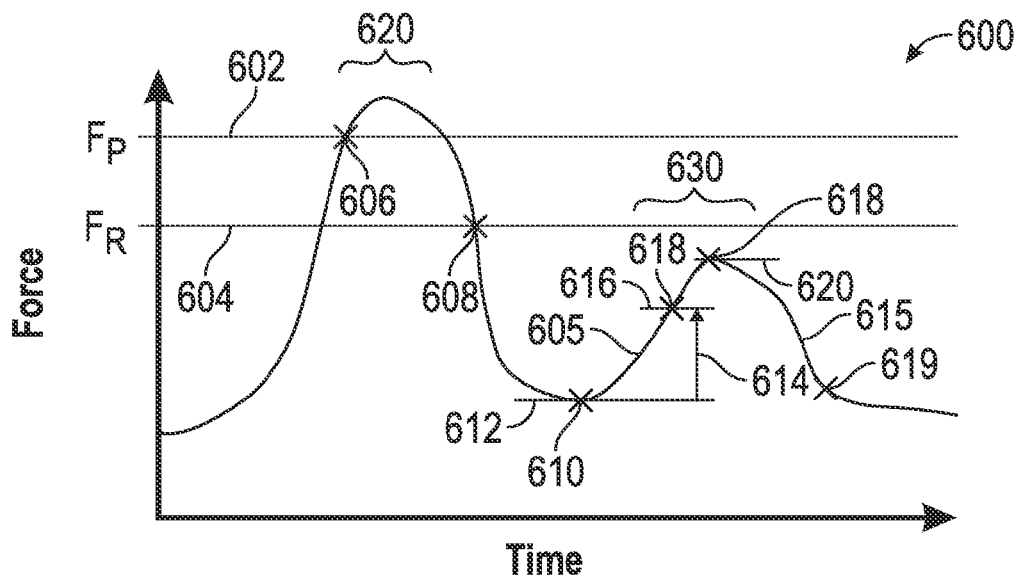
FIG. 6 is a graph of applied force versus time illustrating the detection of an intended double click in a dynamic regime in accordance with an embodiment.

Referring now to FIG. 6, a graph 600 illustrates the adaptive nature of the dynamic regime described herein. Specifically, by establishing user-appropriate values for the threshold $\epsilon$, an intended double click which might be erroneously interpreted as a single click in a static regime may be accurately processed as a double click in a dynamic regime.

More particularly, graph 600 includes a static push force threshold ($F_P$) 602, a static release force threshold ($F_R$) 604, a first click 620, and a second click 630. As explained in greater detail below, only the first click 620 is recognized in a traditional static force system (a false negative event), whereas both clicks 620, 630 may be recognized using the dynamic force detection principles discussed herein.

The first click 620 includes a first push event 606 resulting from the force signal exceeding the static push force threshold ($F_P$) 602, and a first release event 608 resulting from the force signal decreasing below the static release force threshold ($F_R$) 604. The second click 630 includes a monotonically increasing segment 605 bounded at the low end by an inception point 610 (corresponding to a local minimum force value 612) and bounded at the high end by a second push event 618, an apex 618 at a local maximum force level 620, and a monotonically decreasing segment 615 bounded at the high end by the apex 618 and bounded at the low end by a second release event 619.

Note that the second click 630 is entirely below the static push force threshold ($F_P$) 602 and the static release force threshold ($F_R$) 604. Nonetheless, the second click 630 may be detected using the dynamic force techniques described herein. Specifically, the monotonic increase in force above the local minimum 612 (the local minimum 612 being analogous to the baseline value 504 of FIG. 5), represented by upward arrow 614, is equal to the threshold amount $\epsilon$ and, hence, the dynamic push event 618 may be determined at force level 616. The dynamic release event 619 may be determined for the monotonically decreasing segment 615 using similar principles.

Figure 7:
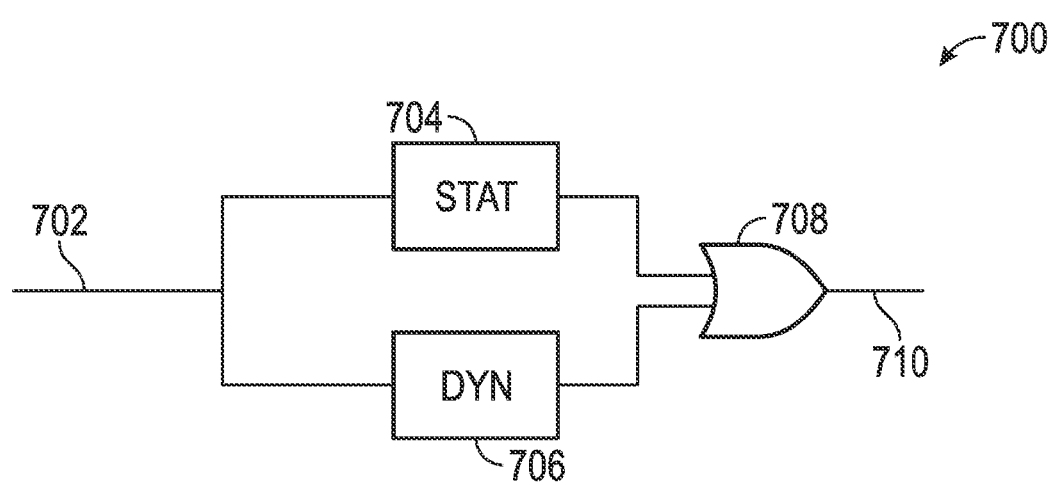
FIG. 7 is a logic diagram illustrating the simultaneous operation of static and dynamic click detection regimes in accordance with an embodiment.

FIG. 7 is a logic diagram 700 modeling the combined operation of static and dynamic click detection regimes in an exemplary embodiment. In particular, the logic diagram 700 includes a static force detection system 704, a dynamic force detection system 706, and an OR gate 708 having an output 710. The static system 704 and dynamic system 706 may operate in an independent, mutually exclusive, or complementary manner. For example, the two systems may each be selectively enabled or disabled depending on the state of the output 710. In one embodiment, if a push event is determined by either system 704 or 706 or by both systems (i.e., if either or both inputs to the OR gate 708 is positive), a push event may be declared. Similarly, if a release event is determined by either or both systems following a push event, a click event may be declared (based on the previously declared push/release combination).

More generally, the static and dynamic force detection regimes may be configured to cooperate in any suitable manner, as set forth in the following Table 1:

TABLE 1

| If Push Determined By | Release May Be Determined By |
|---|---|
| static | static |
| static | dynamic |
| static | static and dynamic |
| dynamic | static |
| dynamic | dynamic |
| dynamic | static and dynamic |
| static and dynamic | static |
| static and dynamic | dynamic |
| static and dynamic | static and dynamic |

As discussed above in connection with FIG. 5, the predetermined threshold amount $\epsilon$ represents the value against which monotonically increasing and decreasing segments are evaluated (or filtered) to determine a dynamic push or dynamic release event, respectively. In many embodiments, $\epsilon$ is the same constant (fixed) value regardless of the magnitude of the local or instantaneous force environment. Moreover, in many embodiments the same fixed threshold value $\epsilon$ is used to evaluate both increasing and decreasing monotonic segments.

Figure 8:
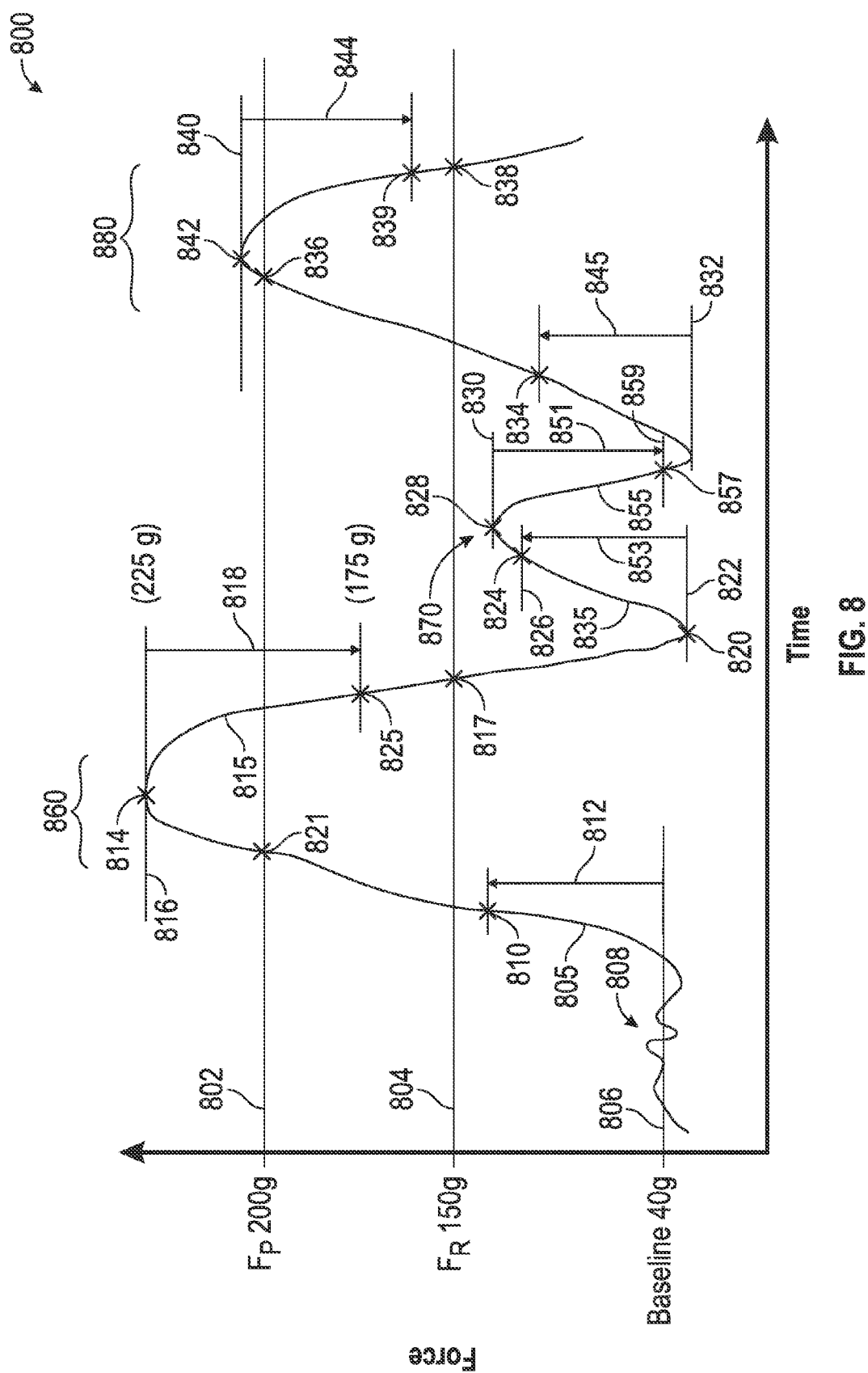
FIG. 8 is a graph of applied force versus time illustrating a signal exhibiting two clicks in a static regime, and three clicks in a dynamic regime, in accordance with an embodiment.

In other embodiments, however, it may be advantageous to use a different threshold value $\epsilon$ for determining a release event than was used to determine the associated push event. In yet other embodiments, it may also be advantageous to use different values for the threshold $\epsilon$ depending on various factors such as, for example, the then current magnitude of the force signal, click frequency, hysteresis level, and the like. FIG. 8 provides a suitable context for describing some of these alternate embodiments.

Referring now to FIG. 8, a graph 800 illustrates a force signal defining two clicks in a static regime, and three clicks in a dynamic regime. More particularly, the graph 800 includes a static push threshold 802 (e.g., in the range of 200 grams), a static release threshold 804 (e.g., in the range of 150 grams), a random walk 808 defining a baseline 806, a first click event 860, a second click event 870, and a third click event 880. As explained in greater detail below, only the first click 860 and the third click event 880 are detected in the static regime, whereas all three click events 860, 870, and 880 are detected in the dynamic regime.

The first click event 860 may include either (or both of) a dynamic push event 810 determined by a monotonic increase segment 805 and an associated $\blacktriangle F$ indicated by the upward arrow 812, and/or a static push event 821 resulting from the force signal exceeding the static force threshold 802. Notably, the force signal associated with the first click event 830 extends well above the static push threshold 802 to an apex (peak force level) 814 at a local maximum force level 816 (e.g., in the range of 225 grams).

The first click event 860 may also include either (or both of) a dynamic release event 825 determined by a monotonic decrease segment 815 and an associated $\blacktriangle F$ (e.g., $\blacktriangle F=50$ grams) indicated by the downward arrow 818, and/or a static release event 817 resulting from the force signal descending below the static release threshold 804.

The second click event 870 includes a dynamic push event 824 at a force level 826 determined by a monotonically increasing segment 835 which begins at a local minimum 820 (corresponding to a force level 822) and has as its upper bound a dynamic push event 824 at a force level 826, and an associated $\blacktriangle F$ indicated by the downward arrow 851. The second click event 870 further includes an inflection point (apex) 828 at a force level 830, and a dynamic release event 857 determined by a monotonic decreasing segment 855 which begins at the apex 828 and ends at a force level 859 determined by the associated $\blacktriangle F$ indicated by the arrow 851.

The third click event 880 may include either (or both of) a dynamic push event 834 determined by a monotonic increase segment indicated by the upward arrow 845 (and associated $\blacktriangle F$), and/or a static push event 836 resulting from the force signal exceeding the static force threshold 802. The third click event 880 may also include either (or both of) a dynamic release event 839 indicated by the downward arrow 844 (and associated $\blacktriangle F$), and/or a static release event 838.

In an embodiment, the threshold value $\epsilon$ which $\blacktriangle F$ must exceed in order to declare a push or release event may be determined as a function of the local force level from which $\blacktriangle F$ is measured. For example, for force signals in a first range from zero to about 250 grams, $\epsilon$ may be in the range of 10 to 100 grams, and suitably about 50 grams. For force signals above the first range, $\epsilon$ may be in the range of 50 to 150 grams, and suitably about 100 grams. In other embodiments, the force signal ranges and corresponding values of $\epsilon$ may be user selected, adapted to observed user behavior, or determined in accordance with aggregate user behavior for a large number of users.

Figure 9:
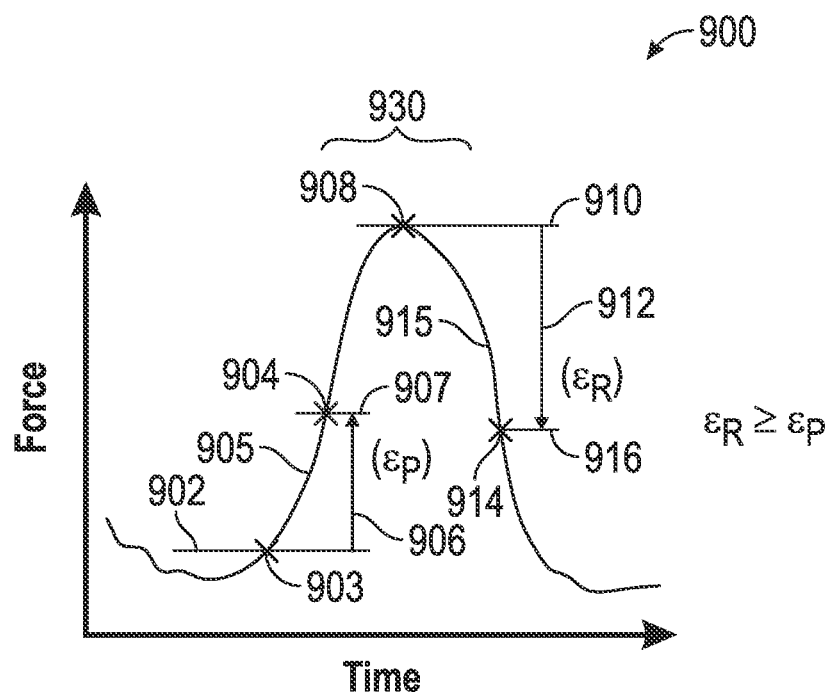
FIG. 9 is a graph of applied force versus time illustrating the relative values of a dynamic push threshold and a dynamic release threshold for a single click in accordance with an embodiment.

FIG. 9 is a graph 900 of applied force versus time illustrating the relative values of a dynamic push threshold $\epsilon_p$ and a dynamic release threshold $\epsilon_R$ for a single click event 930 in accordance with an embodiment. More particularly, the single click event 930 includes a monotonic increase segment 905 bounded by an initial value 903 at a force level 902 and a dynamic push event 904 at a force level 907 determined by $\blacktriangle F=\epsilon_p$ indicated by the upward arrow 906.

The single click event 930 further includes a peak value 908 (corresponding to a force level 910), and a monotonic decrease segment 915 bounded by the peak value 908 and a dynamic release event 914 at a force level 916 determined by $\blacktriangle F=\epsilon_R$ (indicated by the downward arrow 912). As indicated, $\epsilon_R$ may be greater than or equal to $\epsilon_p$; that is, $\epsilon_R \geq \epsilon_p$. As described in greater detail below in conjunction with FIG. 10, it may be desirable in some embodiments to set $\epsilon_R<\epsilon_p$ even within a relatively narrow force range, for example, to compensate for users' tendency to incompletely release between multiple (e.g., double) clicks.

Figure 10:
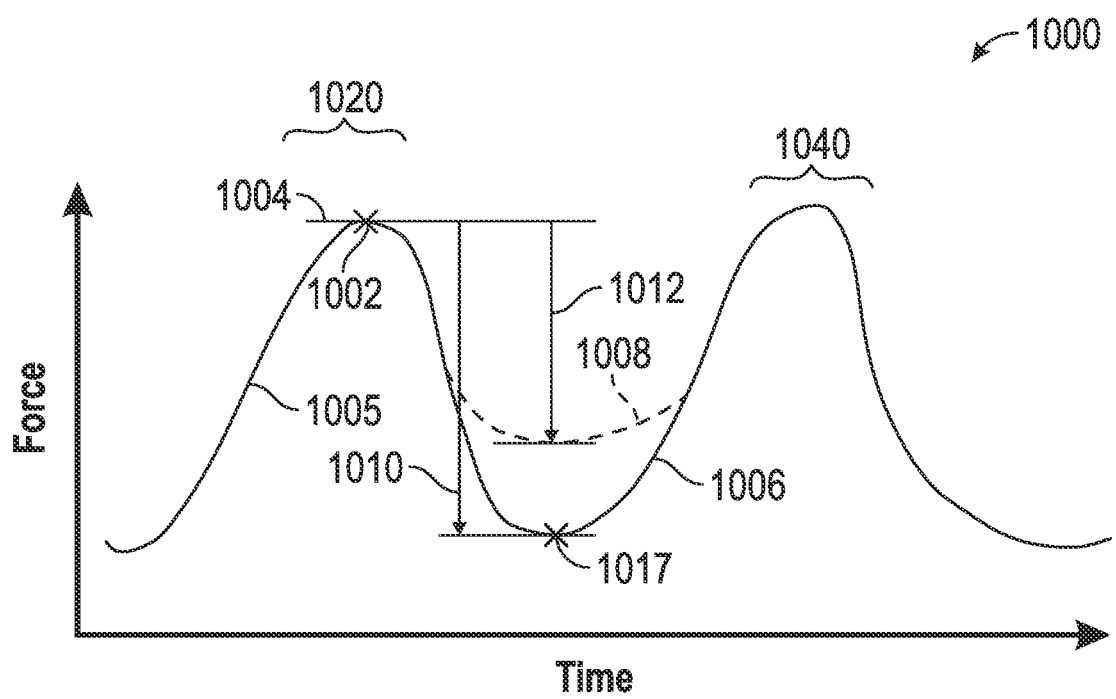
FIG. 10 is a graph of applied force versus time illustrating the "sticky button" phenomenon wherein an intended double click is misinterpreted as a single click in accordance with an embodiment.

Referring now to FIG. 10, a graph 1000 illustrates the "sticky button" phenomenon, wherein an intended double click may be misinterpreted as a single click due to insufficient release between click events. Insufficient release is often caused by the user's intention to shorten the release period as an intention to beat the double click timeout constraint. More particularly, the graph 1000 includes a first click event 1020 and a second click event 1040. The first click event 1020 is characterized by a monotonic increase segment 1005 having an associated predetermined threshold $\epsilon_1$. If the same value $\epsilon_1$ used to determine the dynamic push event is also used to determine the corresponding dynamic release event, then the $\blacktriangle F=\epsilon_1$ indicated by the downward arrow 1010 would determine a first dynamic release event 1017 according to the principles and techniques thus far described.

It has been determined, however, that users often exhibit insufficient release behavior between a first click and a second click which immediately follows the first click, as indicated by the shallow signal trench 1008. Stated another way, the force signal portion 1006 represents that which is required for a dynamic release using the $\blacktriangle F$ threshold $\epsilon_1$. The actual signal behavior typically follows signal trench 1008 between click, with the result that the two intended clicks shown in FIG. 10 may be misinterpreted as a single click because the insufficient release may fail to trigger a dynamic release if $\epsilon_1$ is used as the dynamic release force threshold.

To accommodate the above sticky button problem, a smaller threshold value $\epsilon_2$ may be employed in some embodiments when determining the dynamic release event, where $\epsilon_2<\epsilon_1$. In this way, a smaller $\blacktriangle F$ value (corresponding to the downward arrow 1012) may be used in determining the dynamic release in circumstances where insufficient release forces may be anticipated. In other embodiments, various techniques may be employed in computing or otherwise selecting the dynamic or adaptive release threshold $\epsilon_2$, as described in greater detail below in connection with FIG. 11.

Figure 11:
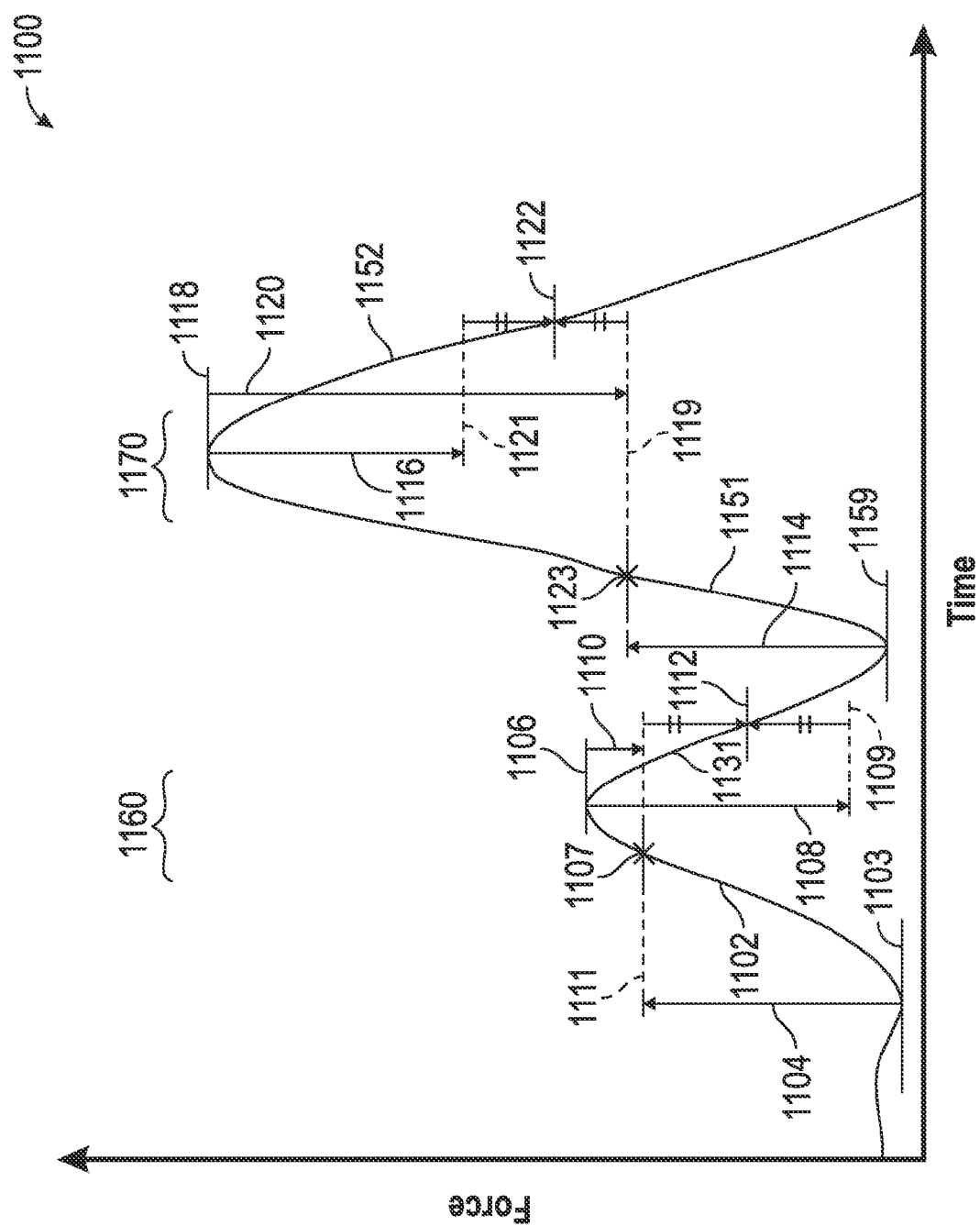
FIG. 11 is a graph of applied force versus time illustrating various techniques for implementing adaptive release thresholds in accordance with an embodiment.

Turning now to FIG. 11, a graph 1100 illustrates a number of techniques for implementing adaptive release thresholds in accordance with various embodiments. More particularly, the force signal depicted in graph 1100 includes a first click event 1160 and a second click event 1170. The first click event 1160 includes a monotonically increasing segment 1102, a dynamic push event 1107 at a force level 1111, a local peak corresponding to a force level 1106, and a monotonically decreasing segment 1131 which extends downwardly from force level 1106. In the illustrated embodiment, the dynamic push event 1107 was determined based on a $\blacktriangle F$ indicated by the arrow 1104 extending from a baseline (or other starting point) to the force level 1111. The length of the arrow 1104 represents a dynamic push threshold $\epsilon_0$.

In one embodiment, the dynamic release event for the first click 1160 may be determined based on the distance 1108 from the peak value level 1106 to force level 1109, where the length of the arrow 1108 is equal to the length of the arrow 1104; that is, the length of the arrow 1108 also corresponds to the dynamic push threshold $\epsilon_0$. Alternatively, the dynamic release event for the first click 1160 may be determined based on the distance 1110 from the peak value level 1106 to force level 1111; that is, the length of the arrow 1110 corresponds to the distance between the local peak value and the force level at which the dynamic push event was previously declared.

In yet a further embodiment, the dynamic release event may be determined based on any value between the length of the arrow 1108 and the length of the arrow 1110; that is, the dynamic release event may be determined to be anywhere between (inclusively) the force level 1111 (the dynamic push event) and the force level 1109. In an embodiment, the dynamic release event may be selected to be at the midpoint 1112 between respective force levels 1111 and 1109. In other embodiments, the dynamic release event may be selected to be an average value, a weighted average value, a median value between respective force levels 1111 and 1109.

With continued reference to FIG. 11, the second click event 1170 includes a monotonically increasing segment 1151, a dynamic push event 1123 at a force level 1119, a local peak corresponding to a force level 1118, and a monotonically decreasing segment 1152 which extends downwardly from force level 1118. As with the first click, the dynamic push event 1123 was determined based on a $\blacktriangle F$ indicated by the arrow 1114 extending from a local minimum 1159 (or other starting point such as a baseline computed from a local random walk) to the force level 1119. The length of the arrow 1114 corresponds to the dynamic push threshold $\epsilon_0$.

In one embodiment, the dynamic release event for the second click 1170 may be determined based on a distance (indicated by the arrow 1116) from the local peak level 1118 to a force level 1121, where the length of the arrow 1116 is also equal to the length of the arrow 1114; that is, the length of the arrow 1116 also corresponds to the dynamic push threshold $\epsilon_0$. Alternatively, the dynamic release event for the second click 1170 may be determined based on the distance 1120 from the peak value 1118 to the force level 1119; that is, the length of the arrow 1120 corresponds to the distance between the local peak value 1118 and the force level at which the dynamic push event 1123 was previously declared.

In yet a further embodiment, the dynamic release event may be determined based on any value between the length of the arrow 1116 and the length of the arrow 1120; that is, the dynamic release event may be determined to be anywhere between (inclusively) the force level 1123 (the dynamic push event) and the force level 1121. In an embodiment, the dynamic release event may be selected to be at the midpoint 1121 between respective force levels 1121 and 1119. Alternatively, the dynamic release event may be selected to be an average value, a weighted average value, a median value between respective force levels 1121 and 1119. Note that the midpoint 1112 corresponds to a distance from the peak value 1106 which is less than $\epsilon_0$, whereas the midpoint 1122 corresponds to a distance from the peak value 1118 which is greater than $\epsilon_0$.

One potential limitation of some of the dynamic force regimes described herein relates to the notion of heavy landing. In this context, a heavy landing occurs when a user's finger initially lands on the force pad with a high level of force intended to be a button push, but does not thereafter increase by an amount sufficient to trigger a dynamic push event. To address this circumstance, in various embodiments an input device may be configured to operate both a static force detection system and a dynamic force detection system, either simultaneously or otherwise. Thus, if a heavy landing fails to trigger a push event in a dynamic regime, it may nonetheless trigger one under a static regime.

Figure 12:
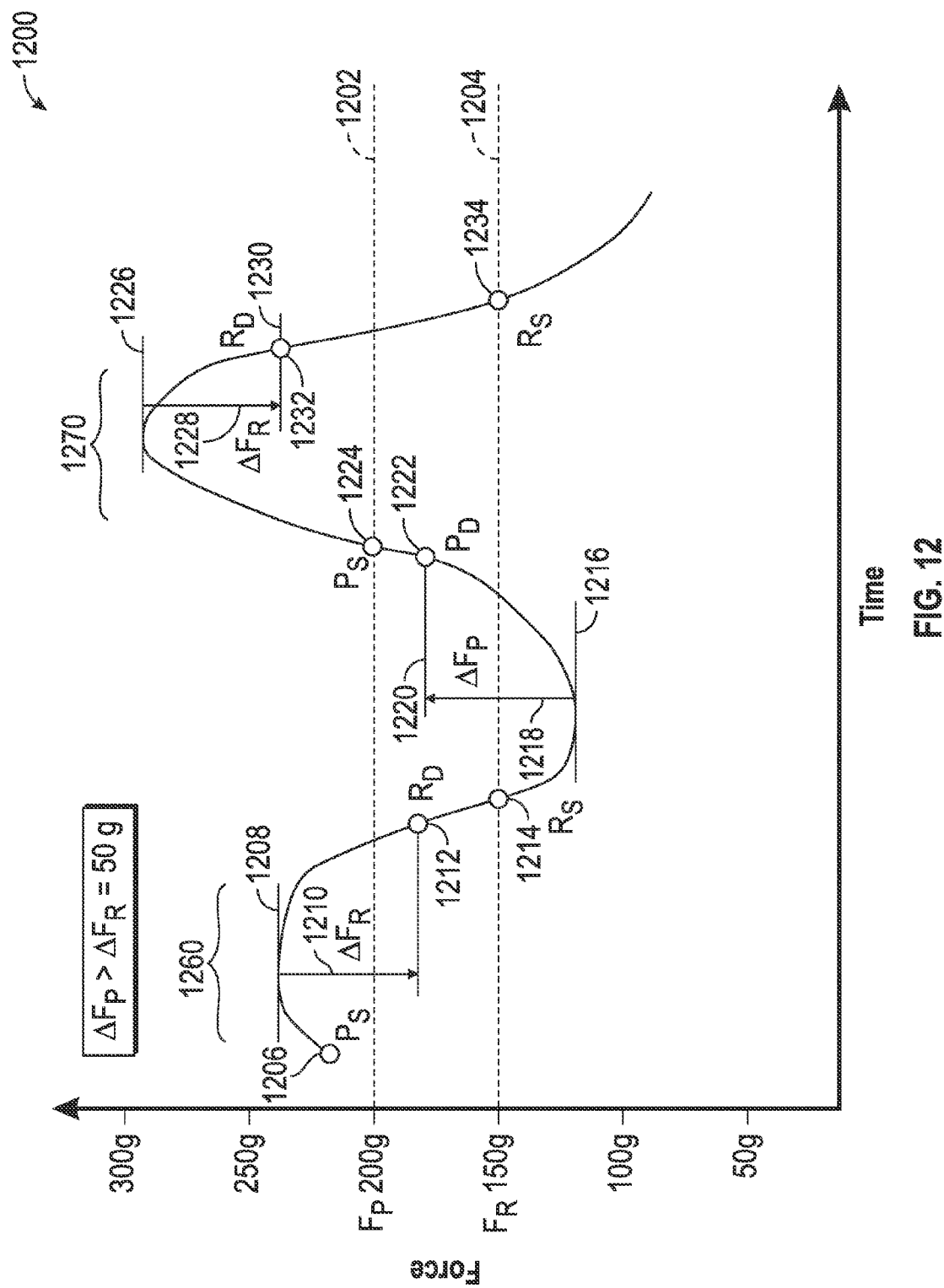
FIG. 12 is a graph of applied force versus time illustrating a hybrid system in which static and dynamic systems may operate simultaneously or mutually exclusively in accordance with an embodiment.

FIG. 12 is a graph 1200 illustrating a hybrid system in which static and dynamic systems may operate simultaneously, mutually exclusively, or otherwise selectively share and/or control the force detection function in accordance with various embodiments. More particularly, the graph 1200 is characterized by a static push threshold 1202 of 200 grams, a static release threshold 1204 of 150 grams, a dynamic push threshold ($\blacktriangle F_P$), and a dynamic release threshold ($\blacktriangle F_R$) (where $\blacktriangle F_P = \blacktriangle F_R = 50$ grams in the illustrated example). A heavy landing point 1206 has an initial force above the static push threshold 1202 (and is therefore deemed to be an intended push action by the user), and thus constitutes a static push event immediately upon contacting the force pad. However, because the initial landing point 1206 does not thereafter monotonically increase beyond the 50 gram dynamic push threshold, it does not satisfy the dynamic push criteria, and is thus not recognized as a push event in the dynamic regime. Accordingly, in the exemplary static/force hybrid embodiment shown in FIG. 12, the processing system is configured to immediately enable or otherwise assign primary or temporary authority to the dynamic regime (vis-à-vis the static regime) upon detecting the heavy landing point 1206.

With continued reference to FIG. 12, following the heavy landing point 1206, the force signal reaches a local peak value 1208, and thereafter descends for a distance $\blacktriangle F_R = 50$ grams (indicated by arrow 1210), whereupon a dynamic release event ($R_D$) 1212 may be determined. As the force signal crosses the static release threshold 1204 at 150 grams of absolute force, at which point a static release event ($R_S$) 1214 may be determined. The force signal thereafter hits a local minimum level 1216 from which the signal monotonically increases for a distance $\blacktriangle F_P = 50$ grams at force level 1220, whereupon a dynamic push event 1222 may be determined. As the signal reaches the static push threshold 1202, a static push event ($P_S$) 1224 may be determined. Following a local peak value 1226, the signal decreases for a distance $\blacktriangle F_R = 50$ grams (indicated by arrow 1228), whereupon a dynamic release event ($R_D$) 1232 may be determined at a force level 1230. Finally, the force signal again crosses the static release threshold 1204, at which point a static release event ($R_S$) 1234 may be determined.

Various control/processing approaches may be implemented for determining whether the various static and dynamic push and release events are determined using the static regime, the dynamic regime, or both the static and dynamic regimes, for example, including those summarized above in Table 1.

In accordance with additional embodiments, various hybrid systems such as those shown in FIG. 12 may also employ some of the adaptive release threshold techniques described above in connection with FIG. 11.

Figure 13:
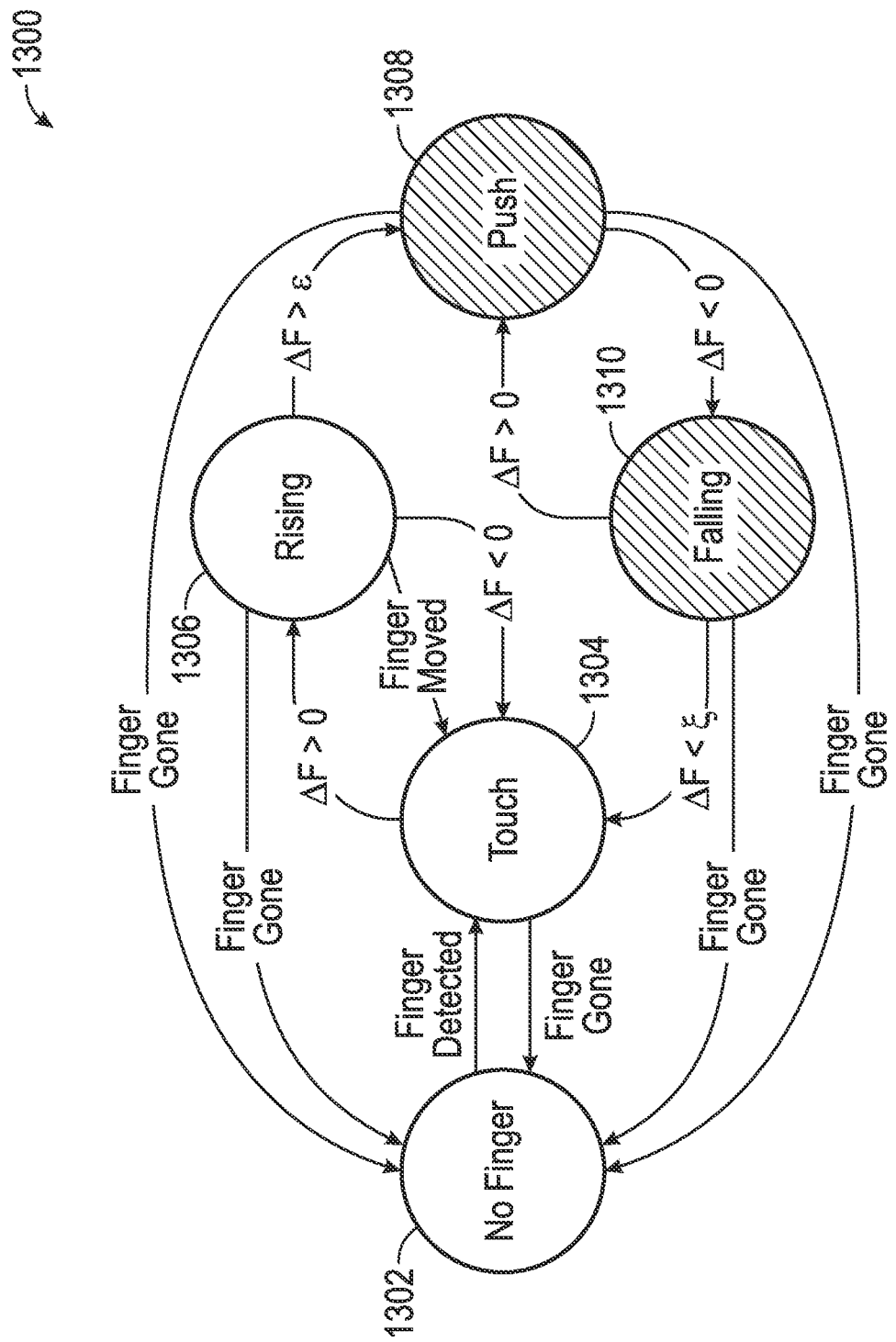
FIG. 13 is a state machine diagram for a dynamic system in accordance with an embodiment.

FIG. 13 is a state machine diagram 1300 for a dynamic system in accordance with various embodiments. Specifically, the state machine 1300 is configured to monitor the increasing and decreasing force patterns (signatures) in a dynamic force detection system.

More particularly, prior to a finger appearing at the force pad surface, the machine remains in a no finger state 1302. When the presence of a finger is detected, the machine 1300 moves to the touch state 1304 where the captured force may be used to compute a baseline against which a subsequent dynamic push may be determined. Alternatively, when push force is detected, a monotonically increasing force may lock the machine into a rising state 1306 until the rise in force exceeds a dynamic push threshold ϵ. When that occurs, a push event may be declared, transitioning the machine into the push state 1308. While in the rising state 1306, any (or any non-trivial) reduction in applied force may move the machine back to the touch state 1304, where the baseline may be continuously updated.

The foregoing detection mechanism may be reversed to detect a release event, except that, in an embodiment, the analogous "baseline" force against which a release is evaluated may be updated when a local peak force is observed. This approach has the advantage of effectively locking up the dynamic release threshold at a very high value in order to facilitate an easier return to the touch state.

In an embodiment, the same mechanism used to track monotonically increasing force may also be used to track decreasing force while in the falling state 1310. Thus, any increasing force detected while in the falling state 1310 may move the machine back to the push state 1308, while any significant decrease in force below the dynamic release threshold value may return the machine to the touch state 1304.

Figure 14:
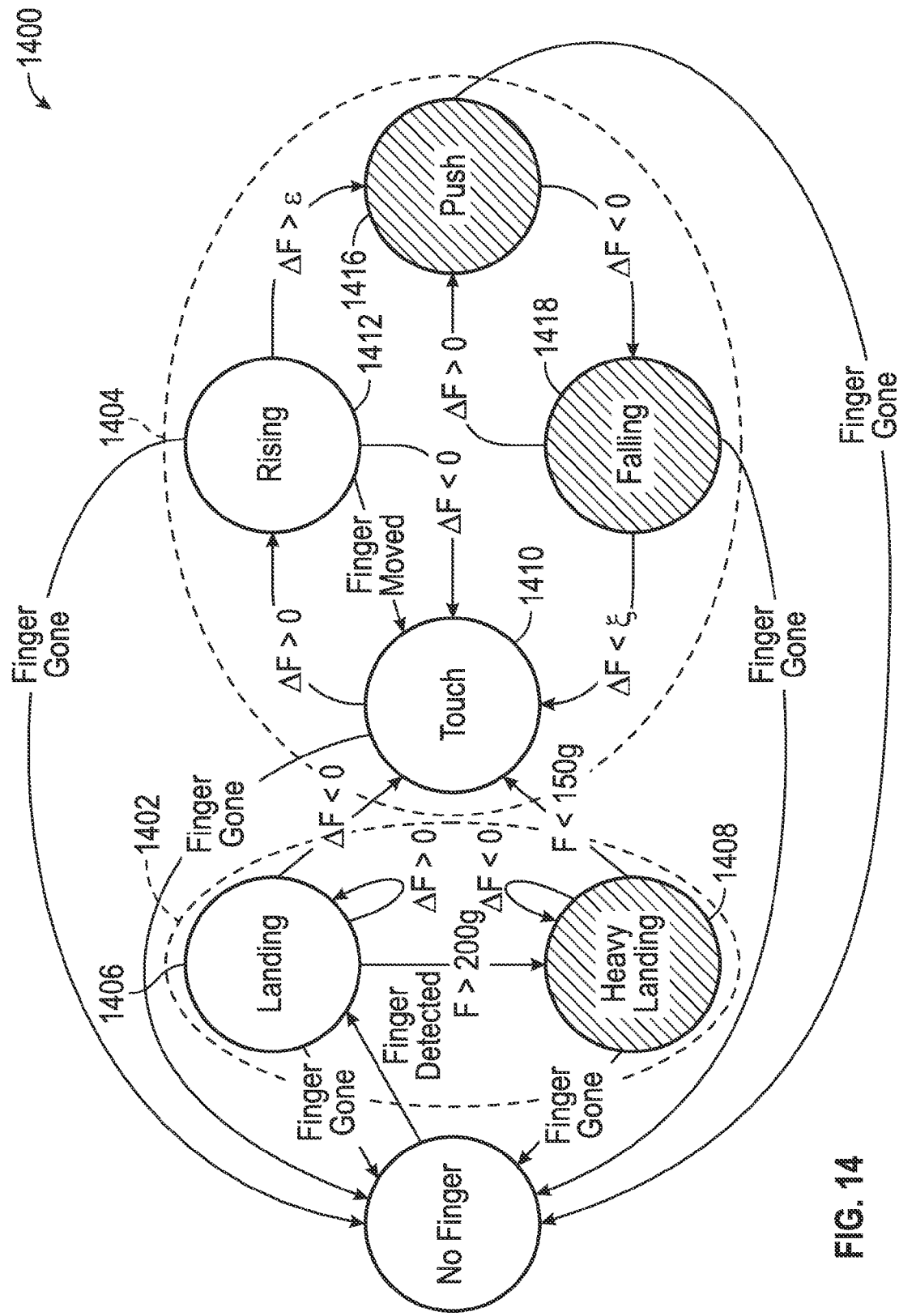
FIG. 14 is a state machine diagram for a hybrid system in which static and dynamic systems may operate simultaneously or mutually exclusively in accordance with an embodiment.

FIG. 14 is a hybrid state machine diagram 1400, generally analogous to machine 1300, for a device in which static and dynamic systems may operate together (e.g., simultaneously or mutually exclusively) in accordance with various embodiments. More particularly, the illustrated embodiment includes two detection schemes working mutually exclusively. A first detection scheme 1402 includes a landing state 1406 and a heavy landing state 1408. A second detection scheme 1404 includes a touch state 1410, a rising state 1412, a push state 1416, and a falling state 1418. The second scheme 1404 operates analogously to the machine 1300 described in detail in connection with FIG. 13, and need not be repeated her in the interest of brevity.

While in the landing state 1406, the machine 1400 monitors normal landings and prevents them from being reported as a push event. When normal force is detected in the landing state 1406, the random walk pattern is identified and the machine moves to the touch state 1410, whereupon the dynamic push detection algorithm takes over, as described above in connection with FIG. 13.

Alternatively, when a heavy landing is detected, the machine moves to the heavy landing state 1408 and a deliberate push event may be presumed. The machine 1400 reports a push event as long as it stays in the heavy landing sate 1408. When the detected force drops below the static force threshold (e.g., 150 grams), the intended push is presumed to have concluded, and the machine moves to the touch state 1410. The aforementioned dynamic force detection scheme takes over and a click may be reported if the dynamic push and dynamic release criteria (discussed above) are satisfied.

Figure 15:
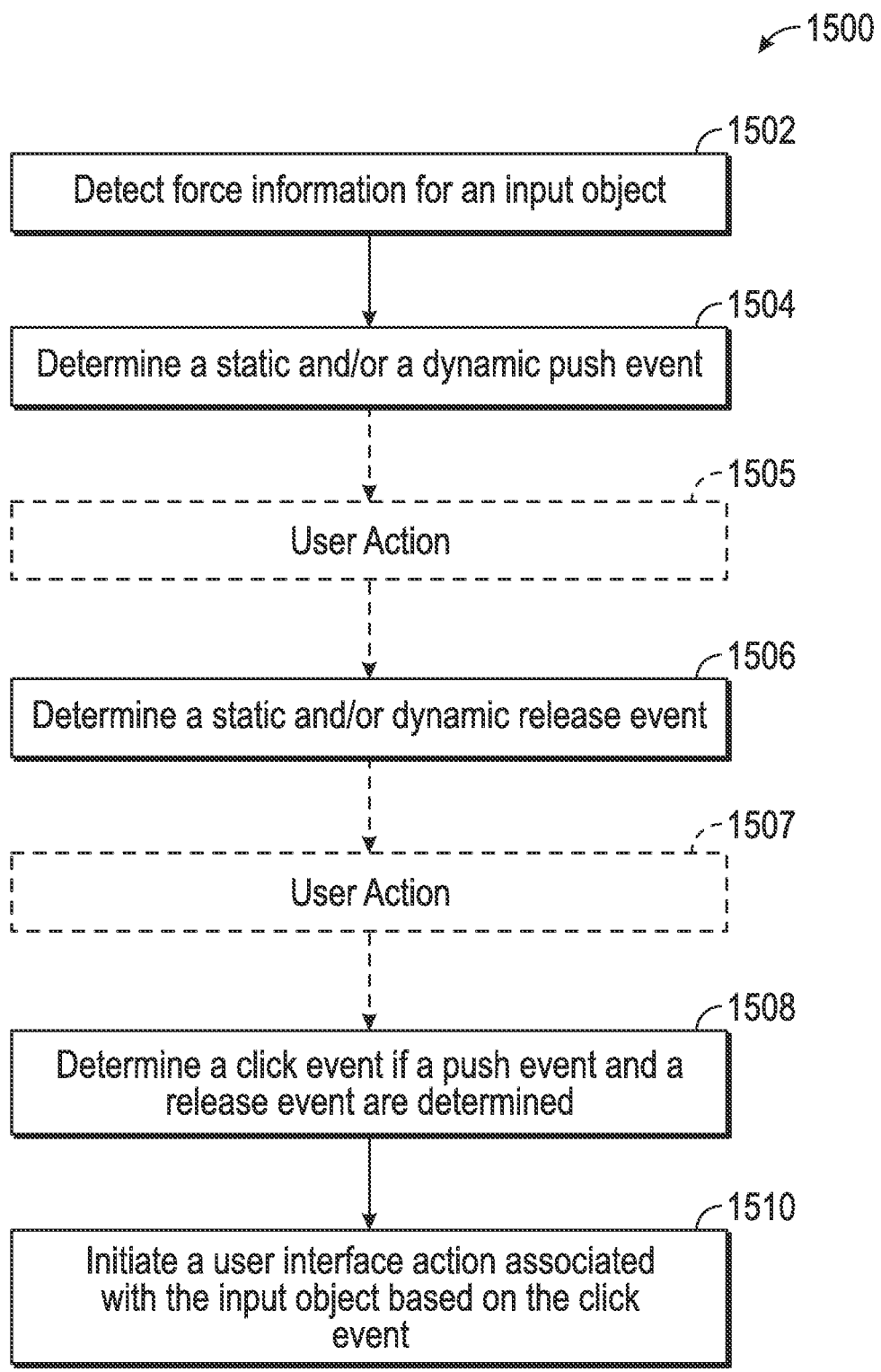
FIG. 15 is a flow chart setting forth a method for determining dynamic push and dynamic release events in accordance with an embodiment.

FIG. 15 is a flow chart setting forth an exemplary method 1500 for determining dynamic push and dynamic release events in accordance with various embodiments. In particular, the method 1500 includes detecting force information for an input object (Task 1502). The method 1500 further involves determining a static and/or a dynamic push event (Task 1504), and determining a static and/or a dynamic release event (Task 1506).

The method 1500 further includes determining a click event (Task 1508) if a push event and a release event are determined, and initiating a user interface action (Task 1510) associated with the input object based on the click event.

Alternatively, an optional user action may occur in response to detecting a rising edge/push condition (Task 1505), and an optional user action may occur in response to detecting a falling edge/release condition (Task 1507).

A method is thus provided for measuring force on a force enabled input device having a touch surface. The method includes detecting force information associated with an input object contacting the touch surface, and determining a push event if the force information is either greater than a predetermined static push threshold value, or a substantially monotonic increase of at least a dynamic push threshold value above a low baseline value. The method thereafter determines a release event if the force information either decreases below a predetermined static release threshold value, or decreases from a maximum baseline value by an amount greater than a dynamic release threshold value. The method initiates a first type of user interface action associated with the input object based on a determination of the push event and the release event, wherein the first type of user interface action may comprise determining a virtual button click.

In an embodiment, the method further includes initiating a second type of user interface action if the push event is determined and the release event is not determined, wherein the second type of user interface action may comprise either a button down event, or a push and hold event.

In an embodiment, the method also involves modifying the second type of user interface action based on positional information for at least one input object translating across the touch surface, where translating may comprise a dragging action or a scrolling action, and further wherein the at least one input object may comprise one of: the same finger used to push and translate; and a first finger used to push and a second finger used to translate.

In another embodiment, the method may also include terminating the second type of user interface action based on a subsequent determination of the release event.

In another embodiment, the method involves determining the low baseline value based on one of: the detected force information for a first predetermined period of time; and a local minimum immediately preceding the substantially monotonic increase in the measured force.

In an embodiment, the method may involve determining the maximum baseline value based on the detected force information for a second predetermined period of time following determining the push event, wherein the maximum baseline value may be based on a peak force value substantially adjacent to the push event, and further wherein the maximum baseline value may correspond to a local maximum value associated with the push event.

In another embodiment, the level of applied force at which the release event is declared may be between the maximum baseline value and the dynamic release threshold value, inclusive.

In an embodiment, the level of applied force at which the release event is declared is in the range defined by: the difference (▲1) between the maximum baseline value and the force level corresponding to the declared push event; and the difference (▲2) between the maximum baseline value and the dynamic release threshold value.

In a further embodiment, the level of applied force at which the release event is declared is one of an average value, a weighted average value, a median value, and a midpoint between ▲1 and ▲2.

In an embodiment, the method may also include not determining a push event when the positional information for the input object exceeds a predetermined threshold.

In an embodiment, the method may also include detecting positional information of the input object in the plane of the touch surface and, in response to the positional information for the input object exceeding a predetermined threshold following determining the push event, either decreasing the predetermined static release threshold value; or increasing the dynamic release threshold value.

A method is also provided for measuring force on a force enabled input device having a touch surface. The method involves detecting force information associated with an input object contacting the touch surface; determining a dynamic push force value ($D_P$) when the force information increases substantially monotonically above a low baseline value by at least a dynamic push threshold value $\epsilon_P$; determining a dynamic release force value ($D_R$) when the force information thereafter decreases substantially monotonically from a maximum baseline value by at least a dynamic release threshold value $\epsilon_R$; and initiating a user interface action upon determining the release force value $D_R$.

In an embodiment, $\epsilon_R$ may be within the range of: i) an upper bound defined by the difference between the maximum baseline value and $F_P$; and ii) a lower bound defined by the difference between the maximum baseline value and $\epsilon_P$.

In another embodiment, the method involves declaring a push based on at least one of: i) the force information increasing from the low baseline value to the value $D_P$; and ii) the force information increasing from the low baseline value to a predetermined static force push value $S_P$; and thereafter declaring a release based on at least one of: i) the force information decreasing from the maximum baseline value to the value $D_R$; and ii) the force information decreasing from the maximum baseline value to a predetermined static force release value $S_R$.

An input device is also provided which includes a force enabled touch pad having a touch surface, and a processing system communicatively coupled to the touch pad. The processing system may be configured to: detect force information associated with an input object contacting the touch surface; determine a dynamic push force value ($D_P$) when the force information increases substantially monotonically above a low baseline value by a dynamic push threshold value $\epsilon_P$; and determine a dynamic release force value ($D_R$) value when the force information thereafter decreases substantially monotonically from a maximum baseline value by a dynamic release threshold value $\epsilon_R$.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. A method for measuring force on a force enabled input device having a touch surface, the method comprising:
   detecting force information associated with an input object contacting the touch surface;
   determining a push event in response to the force information being a monotonic increase to a first force level, the first force level being a sum of a dynamic push threshold value and a low baseline value;
   detecting a peak force value of the push event, wherein the peak force value is greater than the first force level;
   computing a dynamic release force level as an intermediate value using the first force level and a second force level, the intermediate value being in between and non-inclusive of the first force level and the second force level, the second force level defined by the dynamic push threshold value subtracted from the peak force level;

thereafter determining a first release event when the force information decreases below the dynamic release force level; and initiating a first type of user interface action associated with the input object based on a determination of the push event and the first release event.

2. The method of claim 1, wherein the first type of user interface action comprises determining a virtual button click.

3. The method of claim 1, further comprising initiating a second type of user interface action if the push event is determined and the first release event is not determined.

4. The method of claim 3, wherein the second type of user interface action comprises one of:
 a button down event; and
 a click and hold event.

5. The method of claim 3, further comprising modifying the second type of user interface action based on positional information for at least one input object translating across the touch surface.

6. The method of claim 5, wherein translating comprises one of a dragging action and a scrolling action, and further wherein the at least one input object comprises one of: the same finger used to push and translate; and a first finger used to push and a second finger used to translate.

7. The method of claim 3, further comprising terminating the second type of user interface action based on a subsequent determination of the release event.

8. The method of claim 1, further comprising determining the low baseline value based on one of:
 the detected force information for a first predetermined period of time; and
 a local minimum immediately preceding the substantially monotonic increase in the measured force.

9. The method of claim 1, further comprising determining the peak force value based on the detected force information for a second predetermined period of time following determining the push event.

10. The method of claim 9, wherein the peak force value is substantially adjacent to the push event.

11. The method of claim 9, wherein the peak force value corresponds to a local maximum value associated with the push event.

12. The method of claim 1, wherein a level of applied force at which a second release event is declared is greater than the peak force value corresponding to the first release event.

13. The method of claim 1, wherein the intermediate value is declared is one of an average value, a weighted average value, a median value, and a midpoint of the first force level and the second force level.

14. An input device comprising:
 a force enabled touch pad having a touch surface; and
 a processing system communicatively coupled to the touch pad, the processing system configured to:
  detect force information associated with an input object contacting the touch surface;
  determine a push event in response to the force information increasing monotonically to a first force level, the first force level being a sum of a dynamic push threshold value and a low baseline value;
  detect a peak force value of the push event, wherein the peak force value is greater than the first force level;
  compute a dynamic release force level as an intermediate value using the first force level and a second force level, the intermediate value being in between and non-inclusive of the first force level and the second force level,
   the second force level defined by the dynamic push threshold value subtracted from the peak force level; and
  thereafter determine a release event when the force information decreases below the dynamic release force level.

15. The input device of claim 14, wherein the processing system is further configured to determine the low baseline value based on one of:
 the detected force information for a first predetermined period of time; and
 a local minimum immediately preceding the substantially monotonic increase in the measured force.

16. The input device of claim 14, wherein the processing system is configured to determine the peak force value based on the detected force information for a second predetermined period of time following determining the push event.

17. The input device of claim 16, wherein the peak force value is substantially adjacent to the push event.

18. The input device of claim 17, wherein the peak force value corresponds to a local maximum value associated with the push event.

19. The input device of claim 14, wherein a level of applied force at which a second release event is declared is greater than the peak force value corresponding to the first release event.

20. The input device of claim 14, wherein the intermediate value is declared is one of an average value, a weighted average value, a median value, and a midpoint of the first force level and the second force level.

* * * * *